Feb. 12, 1924.
W. C. HEDGCOCK
BRAKE BEAM SAFETY MEANS
Filed Jan. 23, 1922
1,483,633
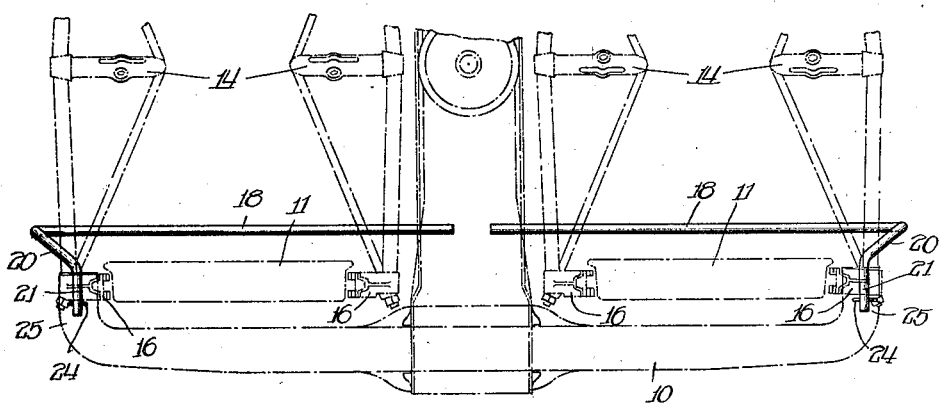
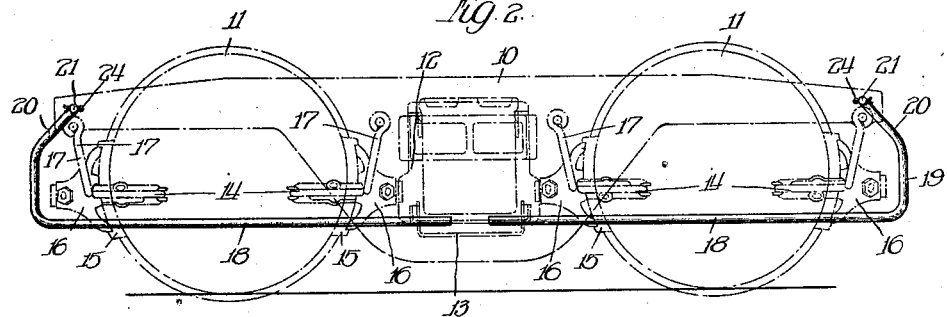
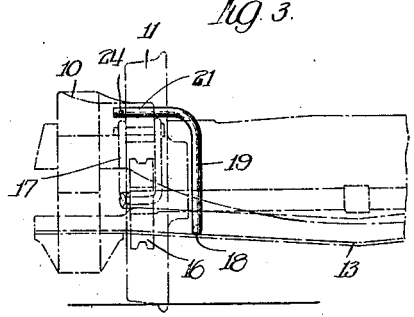
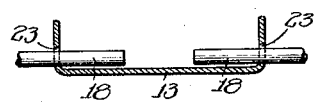
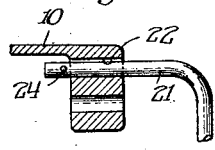
Witness:
R. Burkhardt.
Inventor:
William C. Hedgcock,
By Wilkinson, Huxley, Byron & Knight
attys.

Patented Feb. 12, 1924.

1,483,633

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE-BEAM SAFETY MEANS.

Application filed January 23, 1922. Serial No. 531,109.

*To all whom it may concern:*

Be it known that I, WILLIAM C. HEDGCOCK, a citizen of the United States, residing at Chicago, in the county of Cook and State of Illinois, have invented certain new and useful Improvements in Brake-Beam Safety Means, of which the following is a specification.

This invention relates to brake beam safety means.

One object of the invention is to provide simple, efficient and improved safety means for preventing brake beams from falling to the track in case of failure of some portion of the brake beam or its usual supporting means.

Another object is to provide a simple brake beam safety support designed particularly for use where two brake beams are required per pair of wheels, as in the clasp brake arrangement, and where there is no end rail or tie across the ends of the side frame from which safety supports may be suspended.

A further object is to provide a brake beam safety support which may be easily mounted and dismounted to save time in case it is necessary to take down a brake beam or remove a pair of wheels.

These and other objects are accomplished by means of the arrangement disclosed on the accompanying sheet of drawings, in which—

Figure 1 is a fragmentary top plan view of a railway car truck embodying my invention;

Figure 2 is a fragmentary side elevation of the same arrangement;

Figure 3 is a fragmentary end elevation of the same railway car truck embodying the invention;

Figure 4 is a detail sectional view illustrating the manner in which the safety bars are supported by the spring plank; and Figure 5 is a detail sectional view illustrating the manner in which a safety bar is connected to the side frame.

The various novel features of the invention will be apparent from the following description and drawings, and will be particularly pointed out in the appended claims.

Referring to the figures of the drawings, it will be noted that the invention is illustrated in connection with a railway car truck including a side frame 10 carried by truck wheels 11, said side frame having a bolster opening 12 in the bottom portion of which is mounted a spring plank 13 which extends transversely of the truck from side frame to side frame. The drawings disclose the clasp type of brake mechanism in which the brake beams 14 are arranged on opposite sides of a single pair of wheels, said beams being moved toward each other during a braking action, the brake shoes 15 carried by the brake heads 16 at the ends of the brake beams clasping the associated truck wheels 11. The brake beams are suspended and normally held by hangers 17 which, in this particular instance, are suspended from the side frame 10 and connected directly to the brake heads 16. However, it will be understood that so far as this invention is concerned, the brake beams may be supported normally in any suitable manner.

This invention has to do primarily with means for preventing brake beams from falling to the track in the event that such brake beams become detached from their normal supports or hangings. In this connection I have provided means which takes the form of safety bars each of which has a horizontally longitudinally extending portion 18, a vertically extending portion 19, a portion 20 which extends at an angle upwardly and outwardly with respect to the associated side frame and also has a laterally extending portion 21 which extends transversely outwardly through an opening 22 in an end portion of the truck frame 10 from which the safety bar, in each case, is suspended. The outer ends of the safety bars, and more particularly portions 19 and 20 thereof bow outwardly around the associated brake beam 14, the portion 18 then extends longitudinally of the truck under the brake beams and out of engagement therewith to the spring plank 13. In this particular instance the spring plank 13 takes the form of a channel member having vertically extending flanges 22 which are provided with openings 23 for the reception of the inner ends of the safety bars whereby the latter are supported.

It is apparent that with the safety bars arranged in the manner disclosed, the brake beams 14 will be caught and arrested by the safety bars and prevented from falling to the track in the event that said brake beams are disconnected or torn from their normal hangings. These safety bars extend longitudinally of the truck inwardly from the truck wheels and in positions which in nowise interfere with the operation of parts or adversely limit clearances. The safety bars are easily applied and withdrawn, thereby greatly facilitating repair in the event that it is necessary to remove the brake beams or a pair of wheels. In this connection, it will be noted that the safety bar is applied in position by first passing one end portion through the associated aperture 23 in the spring plank 13 and then by passing the outwardly extending portion 21 outwardly through the opening 22 in the side frame. When set in place a locking key, such as a cotter 24, may be passed through the outer end of the transversely extending portion 21 to normally hold the safety bar against accidental displacement. These safety bars are suspended from the side frame and more particularly suspended from inwardly extending end portions 25 of the side frames. To remove a safety bar it is merely necessary to withdraw the cotter pin 24, draw the portion 21 inwardly through the aperture 22 and then withdraw the portion 18 of the safety bar longitudinally outwardly from the spring plank 13.

It is my intention to cover all modifications of the invention falling within the spirit and scope of the following claims.

I claim:

1. In a railway car truck, the combination of a side frame, a spring plank supported thereby, a truck wheel, an associated brake beam, means for supporting said brake beam, and a safety member supported by said side frame and said spring plank and extending under said brake beam to prevent the latter from accidentally falling to the track.

2. In a railway car truck, the combination of a side frame, a spring plank supported thereby, a truck wheel, an associated brake beam, means for normally supporting said brake beam, and a safety bar which extends under said brake beam to prevent the latter from falling to the ground, one end of said safety bar being suspended from said side frame and being bowed around under said brake beam, the other end of said safety bar being supported by said spring plank.

3. In a railway car truck, the combination of a side frame, a spring plank supported thereby, a truck wheel, an associated brake beam, means normally for supporting said brake beam, and a safety bar one end of which is supported by said side frame and the other end of which is supported by said spring plank, said safety bar having a longitudinally extending portion located under and out of engagement with the brake beam and another portion extending outwardly beyond said brake beam.

4. In a railway car truck, the combination of a side frame, a spring plank supported thereby having an aperture therein, a brake beam normally supported from said side frame, and a brake beam safety bar having a longitudinally extending portion projecting through the aperture in said spring plank and partially supported by the latter and having another portion extending vertically upwardly and suspended from the side frame.

Signed at Chicago, Illinois, this 20th day of January, 1922.

WILLIAM C. HEDGCOCK.